United States Patent

May

[15] 3,665,132
[45] May 23, 1972

[54] PRESSURE-RESPONSIVE CONTROL DEVICE FOR ELECTRICAL CIRCUIT

[72] Inventor: Eugene Noel May, Aurora, Ill.
[73] Assignee: J/B Industries, Inc., Aurora, Ill.
[22] Filed: Sept. 9, 1970
[21] Appl. No.: 70,716

[52] U.S. Cl. .................................................. 200/83 D
[51] Int. Cl. ................................................. H01h 35/40
[58] Field of Search ......................... 200/83 D, 83 E, 83 A

[56] References Cited

UNITED STATES PATENTS 2,849,577  8/1958  Pfeiffer ............................. 200/83 D

FOREIGN PATENTS OR APPLICATIONS 825,277  10/1969  Canada ............................. 200/83 D
1,440,706  4/1965  France ............................. 200/83 D Primary Examiner—J. V. Truhe
Assistant Examiner—J. G. Smith
Attorney—Dawson, Tilton, Fallon & Lungmus

[57] ABSTRACT

A control device is provided which is particularly suitable for use as a re-cycle control for air-conditioning and refrigeration systems. The device includes a pair of electrical contacts adapted to be connected in a series with the electrical control circuit of the system and a pair of pressure-responsive diaphragm pumps which open and close the contacts depending upon the relative pressures acting upon the diaphragms. An electrical resistance is connected across the contacts. When the pressure in one of the diaphragms exceeds the pressure in the other diaphragm by a predetermined amount, the contacts will be opened, although the electrical control circuit will be completed through the resistance. However, the resistance will decrease the current flow in the control circuit, and the current flow will not return to its original value until the differential between the pressures acting upon the diaphragms decreases to permit the electrical contacts to close, thereby effectively shorting the resistance out of the circuit.

9 Claims, 5 Drawing Figures

INVENTOR:
EUGENE N. MAY
BY
Dawson, Tilton, Fallon & Lungmus
ATT'YS 3,665,132

PRESSURE-RESPONSIVE CONTROL DEVICE FOR ELECTRICAL CIRCUIT

BACKGROUND

This invention relates to a pressure-responsive control device for electrical circuits, and, more particularly, to a control device which is particularly suitable for use in air-conditioning and refrigeration systems.

Air-conditioning and refrigeration systems generally include an electrical compressor for compressing the gaseous refrigerant received from the evaporator and discharging compressed refrigerant gas to the condenser. When a self-equalizing type refrigeration system is first started up, the refrigerant circuit is substantially in equilibrium, and the pressure of the refrigerant between the compressor and the evaporator, i.e., the low-pressure side of the refrigerant circuit, is approximately the same as the pressure of the refrigerant between the compressor and the condenser, i.e., the high-pressure side. When the compressor is turned on and the compressor begins compressing the refrigerant, the pressure on the discharge or high side of the compressor increases while the pressure on the suction or low side of the compressor decreases. During the operation of the compressor in typical refrigeration systems, the pressure differential between the high side and the low side may reach 140 psi, or more.

Refrigeration systems, particularly systems using a permanent split capacitor type compressor, generally include a pair of electrical circuits — a line voltage circuit for operating the compressor and a control circuit which may include a number of protective devices such as a thermostat, high and low pressure cut-out switches, and the like. The line voltage circuit is opened and closed by a compressor relay or line voltage contactor in the control circuit, which is essentially an electromagnet which moves the contactor to close the line voltage circuit when the current in the control circuit reaches a certain value and allows the contactor to move to an "open" position to open the line voltage circuit when the control circuit is opened by one of the protective devices.

If one of these protective devices is actuated, the line voltage circuit will be opened, and the compressor will shutdown. It is desirable, however, to prevent the line voltage circuit from closing to start up the compressor again until the pressures on the high side and low side of the compressor are substantially equalized, even if the irregularity which triggered the protective device has passed. The reason for this is that the compressor generally does not have sufficient starting torque to pump against a high pressure differential, and the compressor may become damaged, fuses for the line voltage circuit may blow, or other problems may ensue.

Some protective devices in the control circuit may be provided with timing devices which are intended to keep the control circuit open for a sufficient time to permit the refrigerant system to reach equilibrium. However, it is possible for some unusual transient condition to cause a protective device to open and then to close upon the passing of the transient condition before the refrigeration system reaches equilibrium. For example, if cold air is directed against the thermostat for a short period of time, the thermostat will open the control circuit, but when the cold air flow is stopped, the thermostat will soon close the control circuit. Another problem of increasing frequency is a temporary voltage lag or drop or power failure which may cause the compressor to shut down but which will not prevent the compressor from attempting to start up again before pressure equilibrium is reached.

A number of protective devices have been tried in an effort to protect the compressor from damage due to premature start up or short-cycling, but none of these devices has proved entirely satisfactory. For example, internal or external overloads may be provided so that when the compressor attempts to start up and pump against a substantial pressure differential, the current that the compressor draws will cause the overload to open the line voltage circuit and shut down the compressor. However, the compressor is still forced to work until the overload opens the circuit, and operation of the compressor under these conditions for even a short time may cause damage. Furthermore, the compressor may attempt to start up several times before sufficient time elapses to restore the refrigerant system substantially to equilibrium.

SUMMARY

The inventive control device does not permit the compressor to start up until the pressure differential between the high and low side of the compressor reaches a desired minimum. The device includes a pair of electrical contacts which are connected in a series with the electrical control circuit, and the contacts are directly responsive to the pressure differential between the high and low side so that the contacts will not close until the pressure differential reaches a pre-selected value. A resistance is connected in parallel with the electrical contacts of the device to form a holding circuit for the control circuit when the compressor is operating normally, even though the electrical contacts of the device are open. However, when the compressor is shut down, the holding circuit resistance (in series with the electromagnet) will cause the electromagnet to fail to pull in (close) the line voltage contacts to close the line voltage circuit until the electrical contacts of the device are closed by virtue of the decrease in the pressure differential, thereby eliminating short-cycling of the compressor and the possible compressor damage.

DESCRIPTION OF DRAWING

The invention will be explained in conjunction with an illustrative embodiment shown in the accompanying drawing in which.

DESCRIPTION OF SPECIFIC EMBODIMENT

Figure 1:
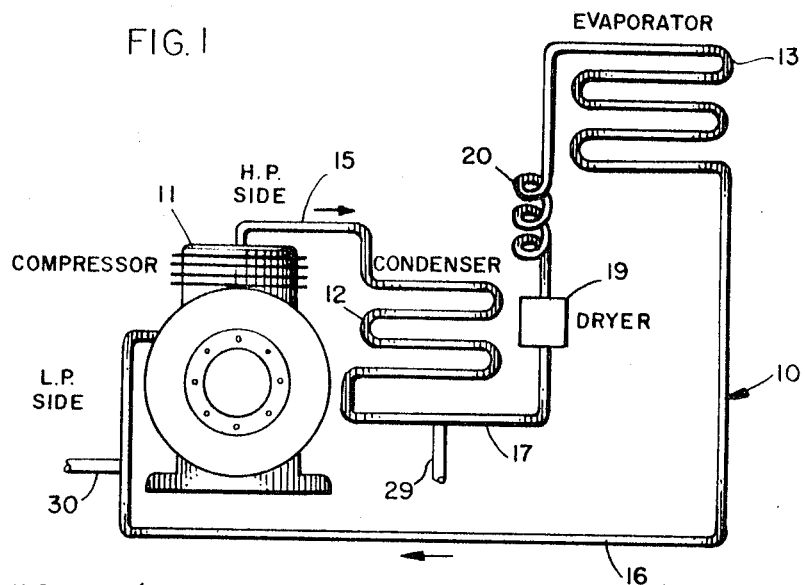
FIG. 1 is a schematic diagram of a conventional refrigeration system.

The invention will be described in conjunction with a conventional air-conditioning or refrigeration system designated generally by the numeral 10 in FIG. 1. Such a refrigeration system typically includes an electrically powered compressor 11, a condenser 12, and an evaporator 13. The discharge or high-pressure side (H.P. Side) of the compressor is connected to the condenser by conduit 15, and the suction or low-pressure side (L.P. Side) of the compressor is connected to the evaporator by the conduit 16. Conduit 17 connects the condenser to the evaporator, and a dryer 19 and a metering device 20 may be interposed in this conduit.

Before the compressor starts up, the refrigerant in the system is under substantially the same pressure throughout the system. When the compressor is started, refrigerant gas is compressed by the compressor and discharged through conduit 15 to the condenser. The condensed refrigerant passes through conduit 17, the dryer and metering device to the evaporator. The refrigerant then returns as a gas through the suction line 16 to the intake of the compressor. As the compressor continues to operate the difference in pressure at the discharge or high side of the compressor and the pressure at the suction or low side of the compressor will increase. The compressor will continue running until one of the conventional protective devices in the electrical control circuit for the compressor causes the line voltage circuit (not shown) to open. After the compressor shuts down, the pressure within the continuous refrigerant circuit will eventually become substantially equalized throughout the circuit, and the pressure differential between the high and the low side will reach substantially zero. At this time the compressor may again be started without risk of damage or overload.

Figure 2:
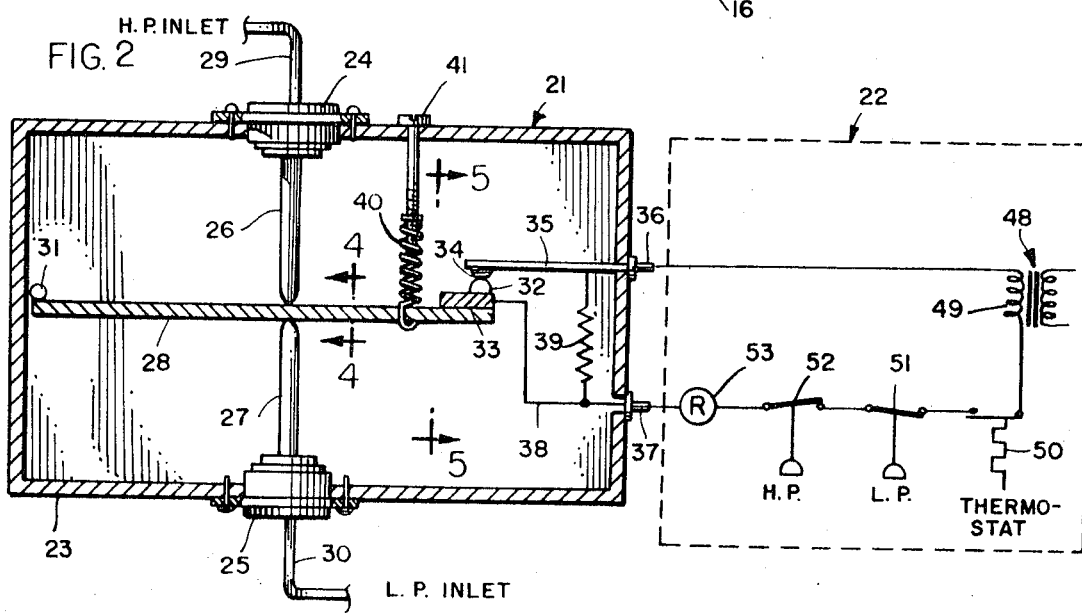
FIG. 2 is a sectional view of the control device, the electrical control circuit for the compressor being shown schematically.
Figure 4:
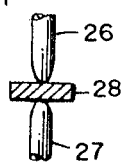
FIG. 4 is a sectional view taken along the line of 4—4 of FIG. 2.

Referring now to FIG. 2, the inventive control device designated generally by the numeral 21 is seen to be connected both to the electrical control circuit for the compressor, indicated in dashed outline and designated generally by the numeral 22, and to the refrigerant circuit. The control device includes an outer frame or housing 23 which can be mounted either exteriorly or interiorly of the air-conditioner or other refrigeration unit. A pair of diaphragm pumps 24 and 25 are mounted in opposed fashion on the casing, and each of the diaphragm pumps includes a drive or actuating pin 26 and 27, respectively, which are engageable with a pivot arm 28. The diaphragm pump 24 is connected to the discharge conduit 15 on the high side of the refrigerant system by the high-pressure inlet conduit 29, and the diaphragm pump 25 is connected to the suction conduit 16 on the low side of the refrigerant system by the low-pressure inlet conduit 30 so that the drive pins 26 and 27 will act upon the pivot arm 28 according to the pressure differential between the high and low side of the system.

The pivot arm 28, which may be formed of insulating material, is pivotally mounted at one end thereof on the casing 23 on pivot 31, and an electrically conductive contact member 32 is mounted on the other end of the pivot arm. If desired, the contact 32 may be mounted on an electrically conductive wiring plate 33. An opposing electrical contact 34 is carried by an electrically conductive mounting strip 35 which extends through the casing 23 and is connected to terminal 36. The strip 35 and terminal 36 are preferably insulated from the casing, which may be metal. A second terminal 37 is mounted on the casing and insulated therefrom and is electrically connected to the wiring plate 33 by wire 38, and an electrical resistance 39 extends between the mounting strip 35 and wire 38 in parallel with the contacts 32 and 34.

One end of a biasing spring 40 is secured to the pivot arm 28 adjacent the contact 32 for maintaining the contacts 32 and 34 in electrical engagement when there is little or no pressure differential between the high and low sides of the refrigerant system. The other end of the spring is mounted on the casing 23 by means of adjusting screw 41, which may be used to adjust the spring tension on the pivot arm as desired.

Figure 3:
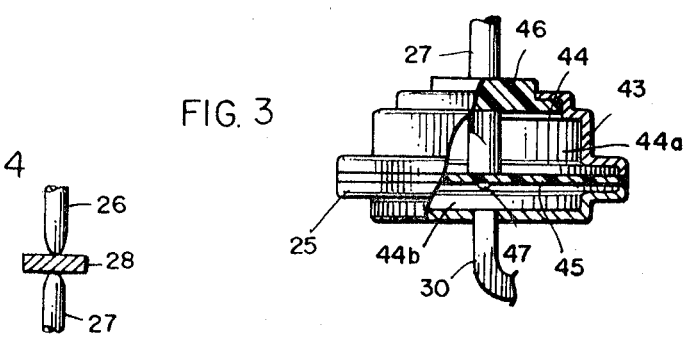
FIG. 3 is an enlarged fragmentary view, partially broken away, of one of the pressure-responsive diaphragm pumps.
Figure 5:
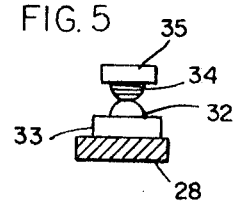
FIG. 5 is a sectional view taken along the line of 5—5 of FIG. 2.

Referring to FIG. 3, the diaphragm pump 25 may be conventional and includes a housing 43 having an interior chamber 44. A flexible diaphragm 45 is mounted within the housing and divides the chamber 44 into upper and lower portions 44a and 44b, respectively. The drive pin 27 extends slidably through a gasket or grommet 46 secured to the housing 43 and the inner end of the drive pin is secured to the diaphragm 45 for movement therewith by attaching screw 47. The lower chamber 44b communicates with the low pressure side of the refrigeration system through the low pressure inlet conduit 30, and the diaphragm 45 is responsive to the pressure of the refrigerant in the suction conduit 16, the drive pin 27 being urged upwardly as the pressure of the refrigerant on the low side increases and being retracted downwardly as the pressure on the low side decreases.

The diaphragm pump 24 is similarly constructed, and the drive pin 26 is moved downwardly as the pressure of the refrigerant on the high side increases and moved upwardly as the pressure on the high side decreases.

The control device 21 is shown in FIG. 2 in its equilibrium condition when the pressures on the high side and low side of the refrigerant system are substantially equal. In this condition, the electrical contacts 32 and 34 are maintained in electrical contact by the spring 40. The spring need provide only enough tension to hold these contacts closed when the pressure differential between the high and low side is substantially zero. However, if desired, the tension of the spring can be adjusted to close the electrical contacts when the pressure differential reaches some other predetermined value. For example, a particular compressor might be able to start up safely against a pressure differential of, say, 15 psi, and the spring tension may be adjusted by screw 41 to close the contacts when the pressure differential is reduced to this level. If desired, the mounting strip 35 for the contact 34 amy be formed of flexible, resilient material such as spring metal which will permit the contact 34 to move upwardly slightly under the force of the spring but which will return the contact to its original position when the contacts are opened.

The electrical terminals 36 and 37 of the control device are connected in series to the control circuit 22 for control of the line voltage or compressor circuit. The control circuit 22 may be conventional, and this type of circuit generally includes a step-down transformer 48 to provide a voltage at the secondary windings 49 below line voltage, and conventional protective devices such as a thermostat 50 and low-pressure and high-pressure cut-out switches 51 and 52, respectively. A line voltage contactor or compressor relay electromagnet 53 is also connected in a series in the electrical control circuit. The line voltage contactor serves to open and close the line voltage circuit (not shown) to operate the compressor when the refrigeration unit is turned on and off and to open the line voltage circuit when one of the protective devices is actuated to open the control circuit 22.

When the compressor is started, the pressure differential between the high and low side of the compressor will immediately begin to increase, and drive pin 26 will urge the pivot arm 28 and the drive pin 27 downwardly, breaking the electrical contact between the contacts 32 and 34. However, even though the contacts are separated, the electrical control circuit 22 will not be open since the circuit will be completed through the resistor 39 which is connected across the terminals 36 and 37. The resistor is chosen to permit sufficient current to flow through the control circuit to hold the compressor relay electromagnet 53 in the "closed" position to maintain a line voltage circuit which operates the compressor. The resistance is sufficient, however, to prevent the flow of sufficient current to activate the electromagnetic relay from the "open" position to the "closed" position.

If one of the protective devices opens the control circuit 22 after the contacts 32 and 34 have become separated, the electromagnet of the compressor relay will immediately deenergize (open), thereby opening the line voltage circuit and shutting down the compressor.

At times the protective device that has opened the control circuit will close before the pressure in the refrigerant system has equalized. For example, the thermostat 50 may open due to an unusual transient condition in which cold air is blown at the thermostat or in which the thermostat control is turned upward and then turned to a lower position. The thermostat will open the control circuit for only a short time and the thermostat will close before the refrigerant pressure has been equalized. When the protective device closes, the control circuit will be completed through the resistor 39, and current will begin to flow through to the compressor relay electromagnet. However, because of the resistor value the current flow will not be sufficient to pull in the electromagnet of the compressor relay from the "open" position to the "closed" position to close the line voltage circuit. Sufficient current to activate the compressor relay electromagnet will not flow until the pivot arm 28 has been raised to close the contacts 32 and 34 so that the current can bypass the resistor 39. As soon as the contacts 32 and 34 close, the compressor relay electromagnet will be fully activated and the line voltage circuit contacts will be closed to start up the compressor. Thus, short-cycling of the compressor is prevented, and the compressor will not start until the pressure on both the high side and the low side has been substantially equalized.

A typical control circuit will operate at 24 volts by virtue of the step-down transformer 48. For such a 24-volt control circuit, a 0.5-amps compressor relay is conventional, i.e., the compressor relay will not switch from the "open" position to the "closed" position until 0.5 amps flows through the electromagnet. The resistor 39 is chosen to permit the current to flow through the control circuit at a value slightly less than the actuating current required for the relay electromagnet. For one particular 24-volt control circuit which included an RBM line voltage contactor No. 95693, the actuating current was 0.5 amps, and I obtained excellent results with a 75 ohm/10 watt resistor. At 24 volts approximately 0.32 amps will flow through this resistor, and the compressor relay will not pull in. However, when the contacts 32 and 34 close, the resistor will be bypassed and sufficient current will flow through the control circuit to actuate the relay. It will be understood, however, that many values of resistance can be used for a particular circuit. The important thing is for the resistor to prevent sufficient current flow to actuate the compressor relay until the contacts 32 and 34 are closed but to permit sufficient current flow to hold the compressor relay in the "on" or "closed" position until one of the protective devices opens the control circuit.

Some control circuits operate at 110 volts, and others operate at 220 volts. For these circuits different values of resistance will be used depending upon the actuating current for the particular compressor relay in the control circuit.

If the control device 21 is provided as part of the original equipment on the refrigeration unit, the manufacturer can readily select the appropriate resistor 39 for the control circuit. However, the control device can also be installed by a service man separate from the original equipment. The service man can first determine the "load circuit" value of the control circuit by using an amprobe multiplier bar or equivalent device, and a resistor is then selected which will reduce the current flow slightly below the load circuit. The electrical terminals 36 and 37 of the device can readily be attached in series to the control circuit, and the high and low pressure inlets 29 and 30 can be connected to the discharge line 15 and suction line 16, respectively, by conventional refrigerant line-tapping valves, or the like.

In the particular embodiment illustrated, the tension of the spring 40 was adjusted to provide merely a slight force to hold the contact 32 against the contact 34 when the pressures in the diaphragm pumps 24 and 25 were approximately equal. However, certain compressors may be able to start up against a slight pressure differential without damage, and in such a case the tension of the spring 40 can be increased so that the contacts 32 and 34 will close before the pressure in the refrigerant system has reached equilibrium.

In the particular embodiment illustrated, a diaphragm pump was provided for both the high-pressure side and the low-pressure side. However, if the refrigeration unit will normally operate at a substantially constant ambient temperature, the control device could be provided with a diaphragm pump for only the high-pressure side, and the tension of the spring 40 could be adjusted to provide sufficient force to return the drive pin 26 to is neutral position in which the contacts close when the pressure acting on the high pressure diaphragm returns to the equilibrium pressure. For example, a particular refrigeration system may have an equilibrium pressure of 75 psi when the ambient temperature is 80° F. The spring 40 can then be adjusted to close the contacts 32 and 34 when only about 75 psi pressure acts against the high-pressure diaphragm. However, since the ambient temperature of the refrigeration unit generally varies, the equilibrium pressure will also vary, and it is desirable to provide a diaphragm for both the high-pressure side and the low-pressure side to ensure closing of the contacts when the refrigerant system reaches equilibrium.

However, a control device provided with a diaphragm pump for only the high-pressure side could provide an ambient temperature lock-out control. For example, if the diaphragm pump 25 was eliminated and the spring force on the pivot arm were reversed so that the spring urged the contacts apart, the spring force could be adjusted so that the contacts would not close even after the refrigerant system reached equilibrium unless equilibrium pressure reached a certain minimum value.

While in the foregoing specification, a detailed description of specific embodiments were set forth for the purpose of illustration, it is to be understood that many of the details herein given may be varied considerably by those skilled in the art without departing from the spirit and scope of my invention.

I claim:

1. A pressure-responsive control device for an electrical circuit comprising a frame, a first, electrical contact on the frame, contact mounting means movably mounted on the frame for movement toward and away from the first electrical contact, a second electrical contact carried by the mounting means, pressure-responsive means including a member movable under the influence of pressure which acts upon the pressure-responsive means, the movable member being engageable with said contact mounting means to move the second contact out of electrical engagement with the first contact, mwans for urging the second contact into electrical engagement with the first contact, and an electrical resistance electrically connected across the first and second contacts.

2. The device of claim 1 in which said pressure-responsive means includes a pressure-responsive flexible diaphragm and said movable member is attached to the diaphragm for movement therewith in response to pressure acting on the diaphragm.

3. The device of claim 1 in which said urging means include a second pressure-responsive means including a member movable under the influence of pressure acting on the second pressure-responsive means, the movable member of the second pressure-responsive means being engageable with the contact mounting means for urging the second contact into electrical engagement with the first contact.

4. The device of claim 1 in which said urging means includes spring means for urging the second contact into electrical engagement with the first contact.

5. The device of claim 1 in which said mounting means comprises a pivot arm for pivoting said one contact toward and away from the other contact, the movable member of the pressure-responsive means being engageable with said pivot arm.

6. A control apparatus for a refrigeration system having an electrically powered compressor, low pressure conduit means for supplying refrigerant to the compressor, high pressure conduit means for conducting refrigerant away from the compressor, and an electrical power circuit for supplying electric current to the compressor, the control apparatus comprising an electrical control circuit having a source of electric current, first and second electrical contacts, electromagnetic relay means connected in series with the electrical contacts, the relay means including contact means movable between a first position in which the electrical power circuit is open and a second position in which the electrical power circuit is closed by the contact means, a resistor connected across the electrical contacts, frame means, one of the electrical contacts being mounted on the frame means, contact mounting means movably mounted on the frame means for supporting the other electrical contact, first and second pressure-responsive means on the frame for connection to, respectively, the high pressure conduit means and the low pressure conduit means of the refrigeration system, the first pressure-responsive means being engageable with the contact mounting means for urging said other electrical contact away from said one electrical contact under the influence of pressure in the high pressure conduit means, the second pressure-responsive means being engageable with the contact mounting means for urging said other electrical contact toward said one electrical contact under the influence of pressure in the low pressure conduit means, current flow through the electrical control circuit when the electrical contacts are in electrical engagement being sufficient to energize the electromagnetic relay means to move the contact means thereof from the first position to the second position, the resistance of the resistor being such that sufficient current flows through the electrical control circuit to maintain the contact means of the relay means in the second position when the electrical contacts are separated but that insufficient current flows through the electrical control circuit to move the contact means of the relay means from the first to the second position when the electrical contacts are separated, the contact means of the relay means moving from the second to the first position when current flow through the control circuit ceases.

7. The apparatus of claim 6 including a spring on the frame connected to the contact mounting means for urging the other electrical contact toward said one electrical contact.

8. A control apparatus for a refrigeration system comprising a frame, a first electrical contact on the frame, a mounting member movably mounted on the frame, a second electrical contact mounted on the mounting member for movement toward and away from the first electrical contact to bring the electrical contacts into and out of electrical engagement, first and second pressure-responsive means on the frame, the first pressure-responsive means being engageable with the mounting member for urging said second electrical contact away from the first electrical contact under the influence of pressure in the first pressure-responsive means, the second pressure-responsive means being engageable with said mounting member for urging said second electrical contact towards the first electrical contact under the influence of pressure in the second pressure-responsive means, the first and second electrical contacts being electrically connected in series with an electromagnetic relay means and a source of electric current to provide an electrical control circuit, a resistor connected across the electrical contacts to provide a holding circuit when the electrical contacts are separated, the electromagnetic relay means including contact means movable between a first position and a second position, the contact means of the relay means being in the first position when no current flows through the control circuit or holding circuit, the relay means being energizeable to move the contact means thereof from the first position to the second position when the electrical contacts are in electrical engagement, the resistance of the resistor being such that sufficient current flows through the holding circuit to maintain the contact means of the relay means in the second position when the electrical contacts move out of electrical engagement but that insufficient current flows through the holding circuit to move the contact means from the first to the second position when the electrical contacts are out of electrical engagement, the contact means of the relay means returning from the second to the first position when current flow through the control circuit or holding circuit ceases.

9. The apparatus of claim 8 including a spring on the frame connected to the contact mounting means for urging the other electrical contact toward said one electrical contact.

* * * * *